Dec. 25, 1956 R. J. KURVERS ET AL 2,775,313
RETRACTABLE CASTER WITH BRAKE
Filed Nov. 17, 1953 2 Sheets-Sheet 1
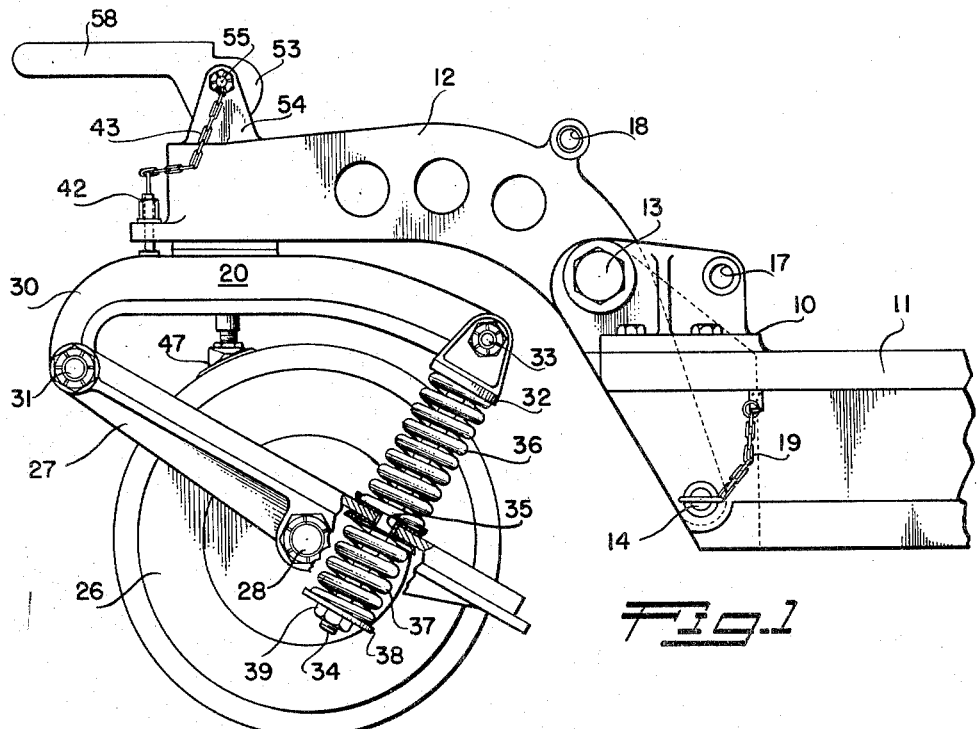
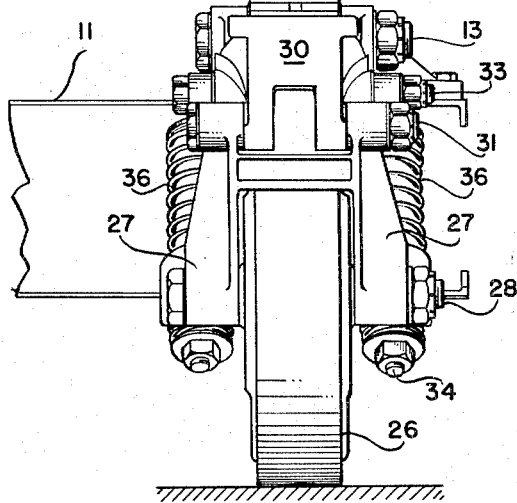
INVENTORS
ROBERT J. KURVERS
GERALD F. SCHELLER
By *George Sullivan*
Agent

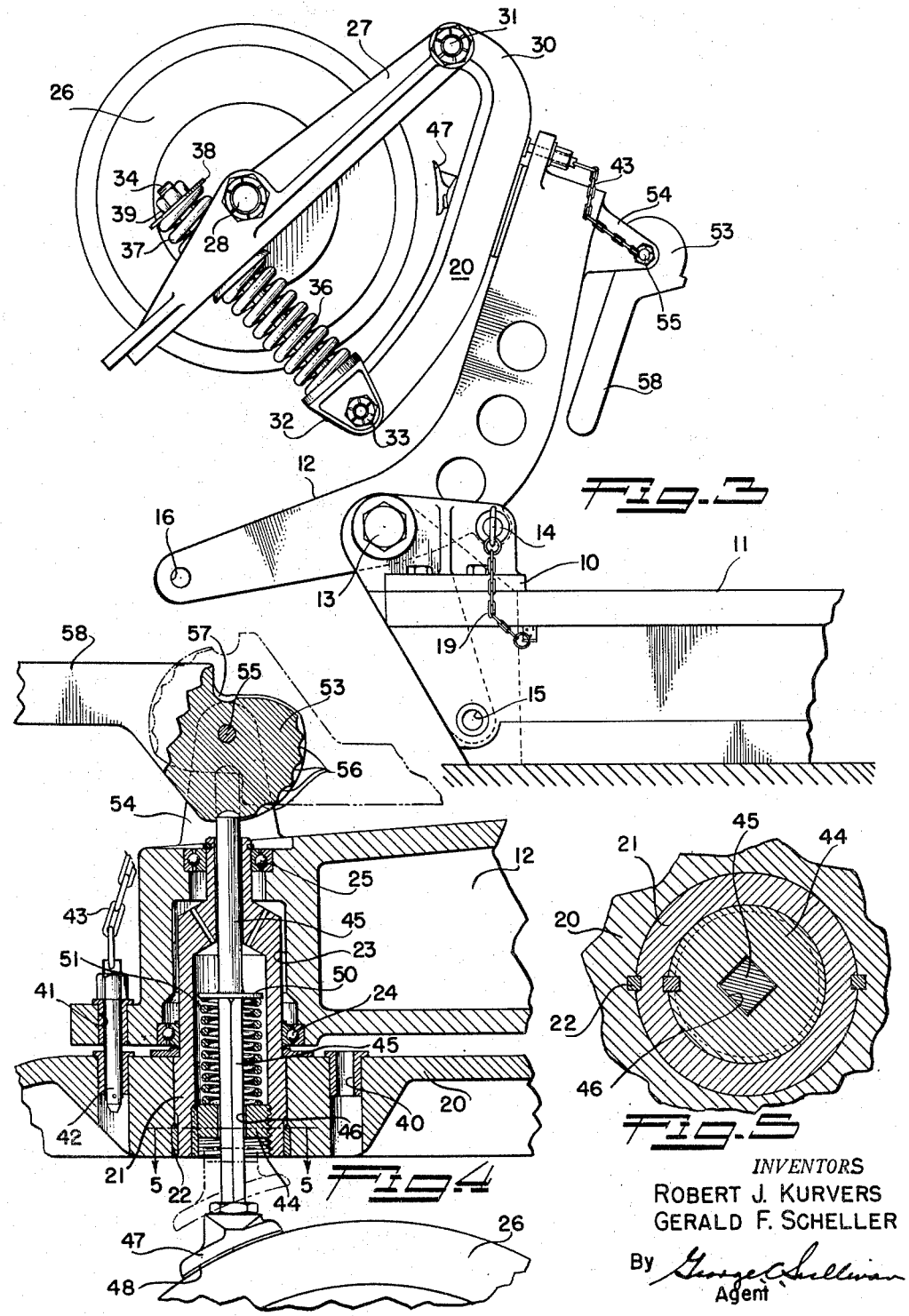

United States Patent Office 2,775,313
Patented Dec. 25, 1956

2,775,313

RETRACTABLE CASTER WITH BRAKE

Robert J. Kurvers, North Hollywood, and Gerald F. Scheller, Pacoima, Calif., assignors to Lockheed Aircraft Corporation, Burbank, Calif.

Application November 17, 1953, Serial No. 392,638

6 Claims. (Cl. 188—2)

This invention relates to swivel casters for use on trucks, dollies, pallets, aircraft ground handling and testing equipment, etc. and relates more particularly to casters of this general class capable of ready, convenient retraction and/or detachment and that incorporate shock absorbing spring means, brakes operative in all castered positions and other novel features of construction. A general object of this invention is to provide simple, practical and effective casters of this class.

Another object of the invention is to provide a caster assembly characterized by novel brake means operative to brake or stop rotation of the ground wheel with the wheel in any castered position. The brake elements are coaxial with the king pin of the caster so that the brake shoe may be readily actuated into and out of braking position regardless of the angular or castered position assumed by the wheel. This universal action of the centralized brake means is also advantageous in that the handle or lever for operating the brake may be arranged to remain in a readily accessible location at all times and with the wheel in all castered positions. The brake lever is not caused to swing or turn as the wheel casters and, therefore, is always in the same known position and is not moved into awkward or inaccessible positions.

Another object of the invention is to provide a caster unit of the character mentioned wherein the caster wheel is sprung by a simple, effective hinged fork and spring combination for absorbing shocks occurring not only when the wheel encounters and rolls over bumps, etc. but also when the wheel rolls into depressions, this floating shock absorbing wheel mounting means being such that the shocks are transmitted to the truck and load through the medium of pairs of dual shock absorbing springs.

Another object of the invention is to provide a caster unit or assembly of the type referred to wherein the centralized brake means and shock absorbing wheel mounts are related so that the brake may be actuated to effectively stop and hold the wheel against rotation when in any castered position and with any load within the load capacity of the unit. The brake actuating means may be constructed with a plurality of "positions" to adapt the brake for use under the various contemplated loads to be handled by the truck, dolly, or other equipment.

A further object of the invention is to provide a caster unit of this general class that is easily and quickly retracted to a position where its wheel will remain clear of the ground or floor. This permits the pallet, the bed of the dolly, or the like, to rest directly on the floor, which is highly important, if not essential, where the equipment is to be transported by air and by other methods where the possibility of rolling must be avoided and where it is desirable to simplify the lashing or tying down of the equipment. The caster unit is easily made retractable by merely withdrawing a single pin, which pin may then be used to lock or retain the caster unit in the raised or retracted position.

A still further object of the invention is to provide a caster unit of the character described having caster lock means for locking the swivelled caster wheel assembly in either of two positions spaced 180° apart to facilitate towing of the dolly, truck, or the like.

Other objectives and features of the invention will become apparent from the following detailed description of a typical preferred embodiment and application of the invention throughout which reference will be made to the accompanying drawings wherein:

Figure 1 is a side elevation of a caster unit of the invention;

Figure 2 is a front elevation of the caster unit;

Figure 3 is a view similar to Figure 1 showing the unit in the raised or retracted position;

Figure 4 is an enlarged fragmentary, vertical, detailed sectional view of the kingpin region of the unit illustrating the brake means and the caster lock means; and Figure 5 is an enlarged fragmentary, transverse, detailed sectional view taken as indicated by line 5—5 on Figure 4.

The caster means or units of the invention may, of course, be used in various situations and with equipment of different kinds. The size and load capacity of the units will be determined by the intended fields of use and the units may have single wheels or dual wheels, as required. Furthermore, where weight is an important factor, as in transportation by air, many of the parts of the units may be constructed of magnesium, magnesium alloys, aluminum, aluminum alloys, etc. In the drawings, we have shown a simple preferred form of the invention which is primarily illustrative and not to be construed as limiting the scope or usefulness of the invention.

The caster assembly, as illustrated, includes a bracket 10 secured to the upper surface of a frame member 11 of the dolly, truck, pallet, or other equipment or device with which the caster is associated. The bracket 10 is dual, or split, to receive a caster supporting arm 12, the arm being pivotally mounted in the bracket by a hinge pin or bolt 13 so as to be movable between the normal position shown in Figure 1 and the raised or retracted position of Figure 3. A readily removable lock pin 14 is engageable in an opening 15 in the bracket 10 or frame 11 and in an opening 16 in the inner end of the arm 12 to retain the arm in its normal operative position. Upon withdrawing the pin 14 the arm 12 may be swung to the raised or retracted position whereupon the pin may be inserted in openings 17 and 18 in the bracket 10 and arm 12 respectively to lock or retain the caster in the raised position. The pin 14 is shown loosely anchored to the frame 11 by a chain 19. When the caster is in its down or normal operating position the arm 12 projects from the frame 11 and its outer portion is generally horizontal.

The swivelling unit of the caster organization includes what may be termed a swivel plate 20 arranged at the underside of the arm 12. A tubular kingpin 21 is secured to the swivel plate 20 and is journalled or rotatably mounted in the arm 12 for rotation about a vertical axis, see Figure 4. In practice the kingpin 21 may be force fitted in an opening in the plate 20 and retained against rotation therein by keys 22. The pin 21 is received with clearance in an opening 23 provided in the arm 12 and rotatably supported therein by spaced appropriate antifriction bearings 24 and 25. One or both of the bearings 24 and 25 are designed to assume end thrusts or loads as well as radial loading. In practice the upper portion of the kingpin 21 and the bearing 25 supporting the same are of reduced diameter. With the construction thus described the plate 20 is free to rotate or swivel about a vertical axis when the arm 12 is in the position shown in Figure 1.

The swivelling unit of the device further includes one or more wheels 26 carried by a fork or frame 27. In the case illustrated there is a single wheel 26 provided with a suitable tire or tread and rotatable on an axle 28. The fork or split frame 27 is pivotally secured to a downturned end portion 30 of the plate 20 by a hinge pin or bolt 31 to have angular movement about a horizontal axis offset from the kingpin 21. The axle 28 of the wheel 26 is carried by the frame 27 to support the wheel for rotation about a horizontal axis spaced from and parallel with the hinge pin or bolt 31.

The shock absorbing spring means of the caster includes brackets or blocks 32 pivotally attached to the swivel plate 20 by pins or bolts 33 to have angular movement about an axis parallel with the bolt 31. Rods 34 are anchored to the blocks 32 and extend downwardly to pass freely through openings 35 in the frame or fork 27. Helical springs 36 are arranged under compression between the brackets 32 and the fork 27 in surrounding relation to the rods 34 to assist in transmitting the loads to the wheel 26. These springs 36 are effective in absorbing shocks incident to movement of the wheel 26 over bumps etc. Somewhat shorter coiled springs 37 surround the rods 34 and are arranged under compression between washers 38, bearing on nuts 39 secured to the ends of the rods, and the underside of the frame or fork 27. These springs 37 are effective in absorbing or reducing the shocks resulting from the movement of the wheel 26 into holes or depression. From the foregoing it will be seen that the assembly or unit comprising the frame or fork 27 and the wheel 26 is carried by the plate 20 to turn or swivel therewith about the axis of the kingpin 21 and to pivot on the pin or bolt 31 in response to load variations and upon operation of the caster over rough ground or an irregular floor.

The invention provides means for holding or locking to the swivel plate 20 against swivelling or angular movement so as to facilitate towing and/or pushing of the truck, dolly, or the like, for certain operations. The plate 20 has two vertical openings 40 spaced 180° apart in relation to the kingpin 21. The outer end of the arm 12 has a similar vertical opening 41 and a lock pin 42 is adapted to be passed through this opening 41 to cooperate with one or the other of the openings 40 to hold the caster against castering or swivelling. The pin 42 is removable from the openings 40 and 41 to allow free castering of the swivel plate and wheel assembly and the pin may be loosely secured to the arm 12 by a chain 43. The pin receiving openings 40 and 41 may be lined or bushed as illustrated.

The invention provides that a self-centering brake means operative to brake rotation of the wheel 26 in any and all castered positions of the wheel. The active or primary elements of this brake means are co-axial with the kingpin 21 to be uneffected by angular movement thereof. The kingpin 21 has a bushing 44 threaded and keyed in its lower end portion and the brake means includes a stem or rod 45 slidable and nonrotatable in this bushing. We have found it practical to provide the bushing 44 with a square or polygonal opening 46 and to make the lower major portion of the rod 45 of corresponding cross-section to slide therein without angular movement. The lower end of the brake rod 45 carries a shoe 47 for engaging against the periphery or tire of the wheel 26. The brake shoe 47 may have suitable friction material in the form of a brake lining 48 for contacting the wheel. The upper portion of the brake rod 45 is cylindrical or round in transverse cross-section and is slidable in the reduced upper portion of the tubular kingpin 21 to extend from the upper end thereof. A shoulder or flange 50 is provided on the rod 45 intermediate its ends and a spring 51 is arranged under compression between this flange and the bushing 44 to return the rod and the shoe 47 upwardly after operation of the brake and to retain the brake in the released condition until again actuated.

The brake means further includes a manually operable cam 53 for actuating the brake rod 45. A pair of lugs or ears 54 projects from the upper side of the arm 12 and the cam 53 is pivotally supported between the ears by a bolt or pin 55. The pin 55 is spaced above the upper end of the brake rod 45 so that the eccentric periphery of the cam 53 may engage or act on the upper end of the rod. The active or eccentric face of the cam 53 is contoured to have an eccentric channel or groove provided with a plurality of circumferentially spaced notches or depressions 56. These depressions 56 have curved concave walls to receive the rounded upper end of the brake rod 45. Due to the eccentricity of the cam 53 the depressions 56 are progressively spaced greater distances from the axis from the cam and Figure 4 shows the end of the brake rod 45 engaged in the depression 56 most remote from the axis of the cam. The cam 53 also has a depression 57 substantially 180° from this most remote depression 56, the depression 57 being relatively close to the axis of the cam and being intended to receive the end of the spring loaded rod 45 when the brake is fully released. The brake actuating cam 53 has a projecting operating handle or lever 58 conveniently accessible at the outer end of the arm 12 to pivot or operate the cam.

The cam 53 may be easily operated or turned to any selected angular position to have a selected depression 56 cooperate with the rod 45 so as to actuate the brake. Because the wheel 26 is mounted through the pivoted fork 27 and springs 36 and 37 the spaced relationship between the arm 12 and the wheel will depend upon the weight of the load and in some cases upon the location of the load being carried by the truck, dolly or the like. In situations where a heavy load is supported on the dolly the arm 12 is closer to the axis of the wheel 26 and when it is desired to brake or lock the wheel against rotation the cam 58 is actuated to bring one of its depressions 56 that is relatively close to its axis into cooperation with the brake rod 45 to move the rod downwardly a relatively short distance and thus assure effective braking cooperation of the shoe 47 with the wheel 26. Conversely when a light load is on the truck or dolly the cam 53 is turned a greater distance to bring one of the depressions 56 that is farther from the cam pivot pin 55 into active engagement with the rod 45. Thus the brake means may be made to effectively brake or lock the caster wheel 26 against rotation under the various operating conditions in which loads of different magnitudes are carried by the truck, dolly, pallet or the like. It should be observed that angular movement or castering of the wheel 26 does not in any way interfere with the operation of the brake means the latter being operative and effective with the wheel 26 in any castered position. The brake rod 45 is co-axial with the caster kingpin 21 and merely turns therewith during castering of the wheels so that the shoe 47 remains in the position at the periphery or tire of the wheel where it can be made operative at any time. On the contrary the cam 53 is mounted on the relatively stationary arm 12 by the ears 54 and pin 55 so that castering of the wheel 26 in no way influences the position of the cam or its lever 58. As a consequence the lever 58 is at all times readily accessible and the condition of the brake means can be readily determined at any time by merely observing whether the lever 57 is in a raised or lowered position.

As described above the arm 12 is hinged or pivoted on the bolt or pin 13 so that it may be raised to a retracted position. The caster unit and its brake means are carried by this arm 12. Accordingly when the arm 12 is raised the caster is retracted, that is, it is raised to an inoperative position. This position is illustrated in Figure 3 of the drawings where it will be seen that the pin 14 is engaged in the opening 18 of the arm 12 to retain the caster in its raised inoperative position. With the caster raised the frame 11 may rest directly on the floor to preclude shifting of the dolly, truck, or the like. This is important in air transportation and other situations where shifting of the load is to be avoided and where it is desirable to avoid complicated lashing and restraining arrangements. It should also be observed that the entire caster unit including the arm 12 is readily demountable from the frame 11 by merely detaching the bracket 10 from the frame 11. By removing the caster the overall weight of the truck, dolly, or the like, is materially reduced which is a highly advantageous feature in air transportation, and the like.

Having described only a typical preferred embodiment of the invention we do not wish to be limited or restricted to the specific details set forth but wish to reserve to ourselves any features or modifications that may fall within the scope of the following claims.

We claim:

1. Caster means comprising a supporting member, a plate carried by the member to swivel about an axis, a rotatable wheel, shock absorbing means mounting the wheel from the plate for movement with the plate about said axis and for relative vertical movement, and brake means including an axially movable rod associated with the plate to swivel therewith and having a longitudinal axis coincident with the first named axis, a shoe on the rod cooperable with the wheel, and manually operable multi-position means on the member for moving the rod a plurality of selected definite distances to force the shoe against the wheel when the plate and wheel are in various relative positions and with the wheel in any castered position.

2. Caster means comprising a supporting member, a plate carried by the member to swivel about an axis, a rotatable wheel, shock absorbing means mounting the wheel from the plate to be offset from said axis, to swivel with the plate about said axis and to have relative vertical movement, and brake means including an axially movable rod having a longitudinal axis coincident with the first named axis, a shoe on one end of the rod cooperable with the wheel, means associating the rod with the plate to swivel therewith so that the shoe moves with the wheel as it casters, and a manually operable cam pivotally supported on the member for moving the rod to actuate the shoe against the wheel, the cam having a peripheral eccentric face and circumferentially spaced depressions in the face each adapted to receive the other end of the rod.

3. A caster unit comprising a support, a swivel plate, kingpin means mounting the plate bearing means mounting the kingpin means in the support for angular movement about a generally vertical axis, a rotatable wheel, means mounting the wheel below the plate to move therewith about said axis, and brake means for the wheel including a rod axially movable along said axis and projectable from the upper side of the support, a shoe on the lower end of the rod engageable with the wheel, a cam pivotally mounted on the upper side of the support and having an active surface for engaging the upper end of the rod, means supporting the rod in said plate for relative vertical movement and to turn with the plate so that the brake shoe and wheel turn together about said axis upon castering of the wheel, and means for turning the cam to force the shoe into braking engagement with the wheel in any castered position.

4. A caster unit comprising a support, a swivel plate, kingpin means mounting the plate on the support for angular movement about a generally vertical axis, a rotatable wheel, means mounting the wheel below the plate to move therewith about said axis and for relative vertical movement, and brake means including a rod axially movable along said axis, a shoe on the lower end of the rod to engage downwardly against the wheel, means supporting the rod in said plate for relative vertical movement and to turn with the plate so that the brake shoe and wheel turn together about said axis upon castering of the wheel, and a cam mounted on the support for angular movement, the cam having a face bearing downwardly against the upper end of the rod provided with a plurality of circumferentially spaced peripheral depressions located different distances from the axis of angular movement of the cam and cooperable with the upper end of the rod to actuate the shoe against the wheel with the wheel in any castered position.

5. A caster organization comprising a support, a swivel element, tubular kingpin means mounting the element at the under side of the support for swivel movement therewith about a generally vertical axis, a rotatable caster wheel, shock absorbing means mounting the wheel at the under side of the element for relative vertical movement, a rod extending through the tubular kingpin means and movable axially along said axis, a brake shoe on the lower end of the rod engageable with the wheel, means supporting the rod in the kingpin means to move axially therethrough and to turn therewith so that said shoe swivels with the wheel when the wheel casters, spring means acting upwardly on the rod to yieldingly hold the shoe clear of the wheel, a cam pivoted on the support and having a cam face acting on the upper end of the rod to move the rod downwardly and bring the shoe into braking engagement with the wheel with the wheel in any castered position, said face having a plurality of depressions spaced graduated distances from the pivotal axis of the cam and each adapted to receive the upper end of the rod, and an operating lever for the cam.

6. Caster means comprising a supporting member having a vertical opening means, a tubular kingpin extending through the opening, spaced bearings mounting the kingpin in the opening for turning about a vertical axis, a plate secured to the lower end of the kingpin to turn therewith, a wheel rotatable below the plate, means mounting the wheel on the plate to turn therewith about said axis and to have vertical movement relative to the plate, a brake rod movable vertically in the kingpin and having an exposed upper end, a brake shoe on the lower end of the rod engageable with the wheel to brake rotation thereof, means preventing relative rotation between the rod and kingpin so that the shoe moves about said axis with the wheel when the wheel casters, and a cam pivoted on the supporting member cooperating with the upper end of the rod to actuate the shoe against the wheel with the wheel in any castered position.

References Cited in the file of this patent

UNITED STATES PATENTS

| Re. 12,598 | Caldwell | Jan. 22, 1907 |
| 802,728 | Amos | Oct. 24, 1905 |
| 1,033,267 | Perry | July 23, 1912 |
| 1,661,889 | French et al. | Mar. 6, 1928 |
| 2,058,205 | Bandura | Oct. 20, 1936 |
| 2,110,227 | Koenigkramer et al. | Mar. 8, 1938 |
| 2,214,176 | Portle | Sept. 10, 1940 |
| 2,228,247 | Cunningham | Jan. 14, 1941 |
| 2,262,288 | Klipstein et al. | Nov. 11, 1941 |
| 2,388,692 | House | Nov. 13, 1945 |
| 2,422,892 | Forbes et al. | June 24, 1947 |
| 2,460,094 | Little | Jan. 25, 1949 |
| 2,564,996 | Rasbach | Aug. 21, 1951 |
| 2,684,734 | Wilson | July 27, 1954 |

FOREIGN PATENTS

| 272,537 | Switzerland | Mar. 16, 1951 |